(12) United States Patent
Heinen

(10) Patent No.: US 6,415,835 B1
(45) Date of Patent: Jul. 9, 2002

(54) PNEUMATIC TIRE TREAD HAVING GROOVE WITH PEAKS AND VALLEYS

(75) Inventor: Richard Heinen, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 110 days.

(21) Appl. No.: 09/590,485

(22) Filed: Jun. 8, 2000

(51) Int. Cl.⁷ .............................................. B60C 11/13
(52) U.S. Cl. ........................ 152/209.21; 152/209.22
(58) Field of Search ..................... 152/209.1, 209.18, 152/209.21, 209.22, DIG. 3

(56) References Cited

U.S. PATENT DOCUMENTS

| | | | |
|---|---|---|---|
| 2,268,344 A | * 12/1941 | Shesterkin | 152/209.18 |
| 2,843,172 A | 7/1958 | Berry et al. | 152/209 |
| 4,230,512 A | 10/1980 | Makino et al. | 152/209 R |
| 4,282,914 A | 8/1981 | Takigawa et al. | 152/209 D |
| 4,481,992 A | 11/1984 | Takigawa | 152/209 R |
| 4,630,661 A | 12/1986 | Stelzer | 152/209 R |
| 4,664,345 A | 5/1987 | Lurz | 244/209 |
| 4,706,910 A | 11/1987 | Walsh et al. | 244/130 |
| 4,750,693 A | 6/1988 | Lobert et al. | 244/200 |
| 4,932,612 A | 6/1990 | Blackwelder et al. | 244/207 |
| 4,936,363 A | 6/1990 | Schuster et al. | 152/209 R |
| 5,031,680 A | * 7/1991 | Kajikawa et al. | 152/209.21 |
| 5,074,324 A | 12/1991 | Ng | 137/13 |
| 5,099,899 A | 3/1992 | Takeuchi | 152/209 R |
| 5,133,519 A | 7/1992 | Falco | 244/200 |
| 5,246,049 A | 9/1993 | Ramcke et al. | 152/209 R |
| 5,289,862 A | 3/1994 | Schuster | 152/209 R |
| 5,350,001 A | 9/1994 | Beckmann et al. | 152/209 R |
| 5,503,206 A | 4/1996 | Consolacion et al. | 152/209 R |
| 5,535,798 A | 7/1996 | Nakamura | 152/209 R |
| 5,542,630 A | 8/1996 | Savill | 244/200 |
| 5,658,404 A | 8/1997 | Brown et al. | 152/209 A |
| 5,830,294 A | 11/1998 | Shibata | 152/209 R |
| 5,863,155 A | 1/1999 | Segota | 406/61 |
| 5,975,176 A | 11/1999 | Scott | 152/456 |
| 6,116,310 A | * 9/2000 | Shinohara | 152/DIG. 3 |
| 6,250,354 B1 | * 6/2001 | Kawai | 152/DIG. 3 |
| 2001/0032691 A1 | * 10/2001 | Ohsawa | |

FOREIGN PATENT DOCUMENTS

| | | | | |
|---|---|---|---|---|
| GB | 460338 | * | 1/1937 | |
| GB | 1587855 | | 4/1981 | B06C/11/06 |
| GB | 2218057 | | 11/1989 | B06C/3/04 |
| JP | 58-22364 | * | 5/1983 | |
| JP | 3-57704 | * | 3/1991 | |
| JP | 4-201606 | * | 7/1992 | |
| JP | 5-286313 | * | 11/1993 | |
| JP | 6-312603 | * | 11/1994 | |
| JP | 080011508 | | 1/1996 | B06C/11/04 |
| JP | 11-151912 | * | 6/1999 | |
| WO | 9518022 | | 7/1955 | B60C/11/13 |

* cited by examiner

Primary Examiner—Steven D. Maki
(74) Attorney, Agent, or Firm—David L. King

(57) ABSTRACT

A tire tread 10 for a pneumatic tire. An external surface 12 of the tread having at least one groove 14 for enclosing and channeling water during use of the tire on wet pavement. The respective groove 14 having at least two surfaces defining a channel. The two surfaces including two side surfaces. A series of peaks 22 and valleys 24 extending across at least one surface. In a preferred embodiment, the peaks 22 and valleys 24 being on two opposing surfaces and having identical wavelengths. The peaks 22 and valleys 24 on a first side surface 16 being 180 degrees out of phase from the peaks 22 and valleys 24 on the second side surface 18.

7 Claims, 3 Drawing Sheets

PNEUMATIC TIRE TREAD HAVING GROOVE WITH PEAKS AND VALLEYS

TECHNICAL FIELD

This invention relates to the tread of a pneumatic tire and, more particularly, to the ability of a groove within the tread to eject water.

BACKGROUND ART

Tire designers are continually striving to improve tire performance. One goal in improving tire performance is to improve the traction between the tire and the road surface in wet conditions. When a vehicle is travelling on a wet road surface at high speeds, hydroplaning of the tires can occur. Hydroplaning is caused by the tire pushing water in front of it as it advances along a road surface. As the tire continues to push the water in front of it, the back pressure of the water increases and progressively lifts the tire ground-contact area off of the pavement. This back pressure is a function of the depth of the water and the speed of the tire. Eventually, with sufficiently deep water and tire speed, the back pressure lifts the tire off of the road surface. When a tire is hydroplaning, there is no traction between the tire and the road surface and thus, control of that tire is lost.

To prevent hydroplaning, tire designers are continually attempting to improve the ability of a tire to eject or channel water away from the tire. U.S. Pat. No. 5,503,206 discloses a tire having improved wet traction to avoid hydroplaning. The tire that is disclosed in this patent has an annular aqua channel and lateral grooves that direct water from the footprint to either the shoulder area or the aqua channel of the tire where it is ejected away from the tire.

Providing grooves for the water to flow through is the first step in improving a tire's wet traction. The second step in ensuring that the tire can efficiently eject the water from these grooves. As the tire travels along the road surface, each groove within the tire ground-contact area forms a channel that is enclosed on all sides.

Since each groove within the tire ground-contact area forms a channel, to roughly estimate whether the water flow through each groove is laminar or turbulent, the groove section located in the tire ground-contact area can be analogized to a pipe. The determination of whether flow through a pipe is laminar or turbulent flow is determined by calculating the Reynolds number Re. The Reynolds number Re for flow though a circular pipe is calculated from the equation: $Re=\rho Dv/\mu$, where $\rho$ is the density of the fluid, D is the diameter of the pipe, $\mu$ is the dynamic viscosity of the fluid, and v is the velocity of the water. Where the groove and road surface combination does not approximate a circular pipe, the diameter D can be replaced by the hydraulic diameter dh, where $dh=4F/U$, where F is the cross-sectional area of the opening and U is the perimeter distance around the opening. Generally, if the Reynolds number Re is greater than 2320, then the flow is expected to be turbulent. For example, the flow of water at a temperature of 5° C.(40° F.) through a 1 cm wide groove on a tire traveling 29 meters per second (approximately 65 mph), estimated using the circular pipe formula, has a Reynolds number Re of 190,789. Thus, the water flow through the groove of a tire travelling at this speed will be turbulent.

Turbulent flow contains eddies or vortices, as shown in FIG. 1 As a result of these eddies, the drag along a surface is higher for turbulent flow than for laminar flow. This drag, known as skin friction drag, decelerates the flow along a surface and forms a boundary layer. Since the flow in the boundary layer is decelerated, the overall flow is reduced.

U.S. Pat. No. 4,706,910 discloses a flow control device that reduces skin friction on aerodynamic and hydrodynamic surfaces. The reduced skin friction is achieved by modifying the micro-geometry of the surfaces by adding riblets or large eddy breakup devices.

U.S. Pat. No. 4,750,693 discloses a device for reducing the frictional drag on a surface of a body in a flowing medium. The surface is provided with an asymmetrical microstructure in the form of a grooved profile.

U.S. Pat. No. 4,865,271 discloses a wall surface with an array of small longitudinal projections or riblets for reducing drag across the surface. The riblets modify the boundary layer flow over the surface to reduce the surface drag.

U.S. Pat. No. 5,133,519 discloses a device that reduces skin friction drag caused by turbulent shear flows of a fluid over a wall surface. The device includes rearward facing microsteps that reduce the drag caused by eddies.

Devices that reduce skin friction drag have received a great deal of attention in recent years, especially on the surfaces of air, water, and land vehicles. The reduction of skin friction drag caused by these devices can result in increased fuel efficiency for aircraft that results in savings of millions of dollars per year. Such devices may also be used in pipelines, as suggested by U.S. Pat. No. 4,907,765. However, drag reduction devices have never been incorporated into tire technology. Although the flow of water through a tread groove may be analogous to the flow of water through a pipe, a tire designer would not look to pipe technology in designing a tread. First, the leading edge of the tire footprint attempts push much of the surface water out of the path of the tire. Secondly, for the water that does enter the grooves, there are three main distinctions between the flow of water through a tread groove and that through a pipe: (1) in a pipe, the water is in motion whereas, in a tread groove, the water is relatively stationary and the groove is in motion, (2) the water flowing through a pipe is in motion relative to all sides of the pipe; whereas, in a tread groove, the water flowing through the groove is in motion relative to only a portion of the enclosed channel since there is little or no motion of the water relative to the ground surface, and (3) in a pipe, the pipe walls remain stationary; whereas, in a tire tread, the surfaces of a groove are subject to vibrations when the tire is in motion. Even when the pressure of the water entering the groove near the leading edge of the tire footprint creates motion of the water forcing it toward the rear of the footprint, the velocity of the water across the road surface if minimal compared to that across the surface of the groove.

International Patent Application Number PCT/JP94/02229 to Fukato disclosed a groove in a tread surface of a tire having a continuously waved bottom surface whose top does not reach the tread surface which claims to increase the ability to discharge water while avoiding an increase in the proportion of the groove. Unfortunately, because such a groove requires a bottom surface, that groove inherently must be very wide to have any effect. The paradox is wide grooves already have the capacity to discharge large volumes of water and resist hydroplaning. Applicants present invention works efficiently on narrow "V" shaped grooves having no bottom surface or narrow bottom surfaces. Greatly increasing the value of the invention concept allowing for greatly reduced groove void volumes that are superior in water discharging than conventional grooves.

SUMMARY OF THE INVENTION

This invention provides a tire tread for a pneumatic tire. An external surface of the tread has at least one groove for enclosing and channeling water during use of the tire on wet pavement. The groove has at least two surfaces defining a channel. The two surfaces include two side surfaces. The respective side surfaces begin at the external surface of the tread and extend radially inwardly toward an axis of rotation of the tire. The two side surfaces either intersect with one another or with a bottom surface. The groove having a depth defined by an average distance from the external surface of the bead to the intersection of the two side surfaces or to the bottom surface of the groove. A median plane bisects the channel formed by the respective surfaces of the groove. The groove has a width defined by twice an average distance from the median plane to a respective side surface.

The tire tread is characterized by a series of peaks and valleys located on both side surfaces of the groove wherein each valley extends continuously from one side surface of the groove to the other side surface of the groove. An imaginary line or arc located on the media plane within the depth of the groove extends along the length of the groove. At least half of the valleys following imaginary lines skewed with respect to the median plane or arc by an angle or angles in the range of 45 to 90 degrees from the median plane. Each peak has a maximum depth of 15% of the groove width and a minimum depth of at least 5% of the groove width. The depth is defined as the average distance from the peak to the valley.

In a preferred embodiment, the peaks and valleys are on two opposing surfaces of the groove. The peaks and valleys, on the two opposing surfaces, have identical wavelengths and the peaks and valleys on a first surface are 180 degrees out of phase from the peaks and valleys on a second surface.

The inventor believes that the use of the claimed invention can help reduce the undesirable effects of the eddies within the boundary layer of water contacting a groove surface. As a result, the skin friction drag along the respective surface of the groove will be reduced and the flow of water from the groove should be increased.

Definitions

For ease of understanding this disclosure, the following terms are disclosed.

"Boundary layer" means the region close to the surface of a solid body over which a fluid flows where the fluid viscosity has an effect. The viscous effect within the region is evidenced by a reduction in velocity of the fluid as the surface is approached.

"Eddy" or "eddies" means a vortexlike motion of a fluid running contrary to the main current.

"Groove" means an elongated void area in a tread that may extend circumferentially or laterally about the tread in a straight, curved, or zigzag manner. Circumferentially and laterally extending grooves sometimes have common portions and may be sub-classified as "wide," "narrow," or "slot." A "slot" is a groove having a width in the range from about 0.2% to 0.8% of the compensated tread width, whereas a "narrow" groove has a width in the range from about 0.8% to 3% of the compensated tread width and a "wide" groove has a width greater than 3% thereof "Laminar flow" means streamline flow of an incompressible, viscous Newtonian fluid; all particles of the fluid move in distinct and separate lines.

"Pneumatic tire" means a laminated mechanical device of generally toroidal shape, usually open torus, having beads and a tread and made of rubber, chemicals, fabric and steel or other materials. When mounted on the wheel of a motor vehicle, the tire through its tread provides traction and contains the fluid that sustains the vehicle load.

"Reynolds number" is a dimensionless number that is significant in the design of a model of any system in which the effect of viscosity is important in controlling the velocities or the flow pattern of the fluid.

"Tread" means a molded rubber component which, when bonded to a tire casing, includes that portion of the tire that comes into contact with the road when the tire is normally inflated and under normal load.

"Turbulent flow" means flow in which the motion of the fluid is subjected to irregular velocities and pressures and results in motion in a random manner. Eddies are located in turbulent flow.

BRIEF DESCRIPTION OF DRAWINGS

The invention will be described by way of example and with reference to the accompanying drawings in which.

DETAILED DESCRIPTION OF THE INVENTION

Figure 1:
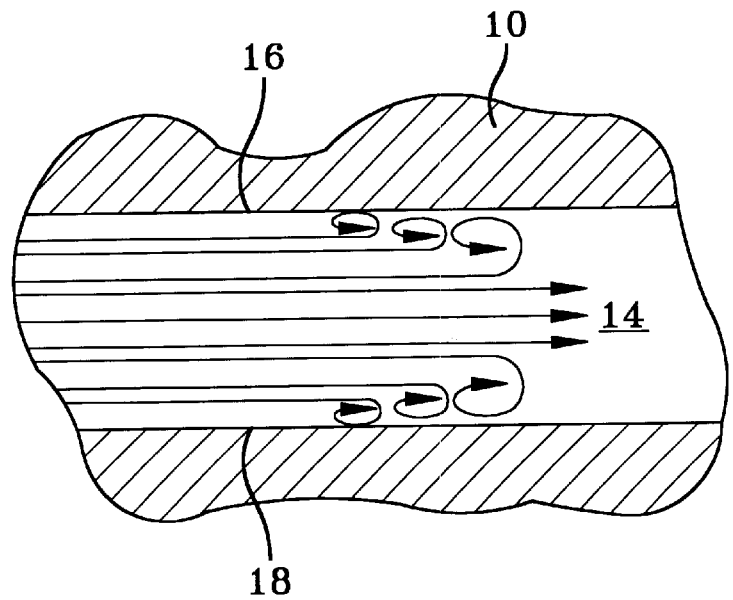
FIG. 1 is depicts the flow of water through a prior art groove on a tire tread.
Figure 2:
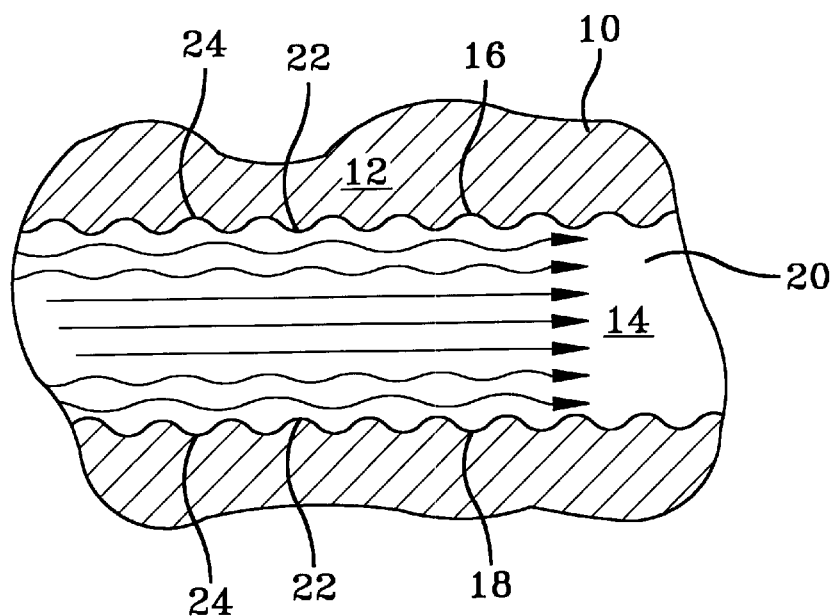
FIG. 2 is depicts the flow of water through a groove of the invention.

FIG. 2 depicts the flow of water through the groove 14 of a tire tread 10. The groove 14 contains a series of peaks 22 and valleys 24, also called eddy breakup devices. The surfaces of the groove 14 in the tire tread 10 include at least two surfaces. The groove illustrated in FIG. 2 contains three surfaces, a first side surface 16, a second side surface 18, and a bottom surface 20. When the external tread surface 12 adjacent to the groove 14 contacts the road surface, the groove 14 forms a channel and encloses any water remaining on the road surface. The arrow or arrows shown in each figure depicts the direction of water flow in relation to the groove 14.

When the flow of water through the groove 14 is turbulent, many eddies or vortices are present in the flow. Since portions of these eddies flow in a direction contrary to the main current, the flow creates high shear stresses on the groove surfaces and results in increased skin friction drag. Skin friction drag is the drag caused by flow of a fluid over a surface of a solid body. The peaks 22 and valleys 24 of this invention disrupt the eddies or vortices that are present along the respective groove surface. The peaks 22 and valleys 24 disrupt the eddies by disrupting the tangential flow and the reverse flow regions of the eddies. As a result, the skin friction drag along the surface of the groove 14 is decreased. This decreased skin friction drag results in an increased flow of the water near the respective surface of the groove 14 and thus, an increased flow of water from the groove 14.

Figure 3:
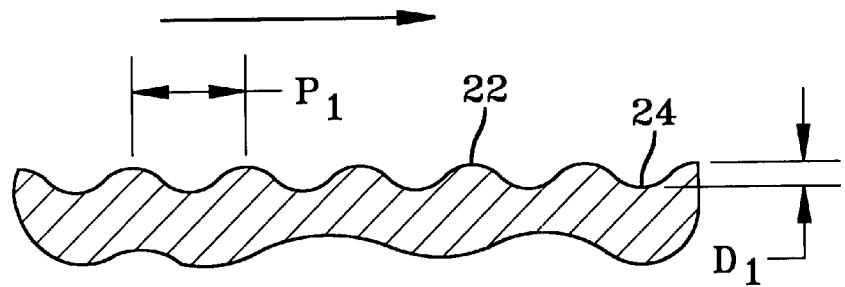
FIG. 3 is a view of an embodiment of the groove surface undulations.
Figure 4:
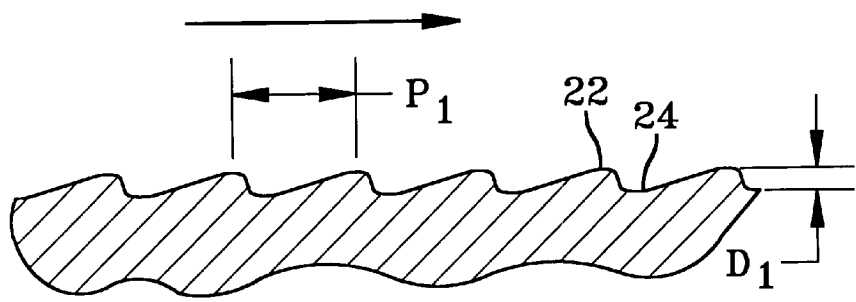
FIG. 4 is a view of a second embodiment of the groove surface undulations.

FIG. 3 through FIG. 6 show different embodiments of peaks 22 and valleys 24 of the invention. FIG. 3 shows the peaks 22 and valleys 24 being a plurality of sinusoidal waves. FIG. 4 shows the peaks 22 and valleys 24 forming a sawtooth configuration. Each peak in the series of peaks 22 and valleys 24 is separated by a pitch P1 and has a depth D1. Both the pitch P1 and the depth D1 can be optimized for a given Reynolds number. Since the Reynolds number is dependant upon velocity and the groove dimensions, the pitch P1 and the depth D1 can be optimized for a particular speed and groove size. For example, if a tire manufacturer decides to optimize wet traction for a tire at 29 meters per second (approximately 65 mph), the manufacturer could optimize the pitch P1 and the depth D1 of the peaks 22 and valleys 24 to provide the greatest reduction of skin friction drag at that velocity. Generally, the pitch P1 will be less than 40% of the groove width GW and the depth D1 will range from a maximum of 15% of the groove width GW to a minimum of 5% of the groove width GW. Preferably, the pitch P1 will be less than 5 mm and the depth D1 less than 3 mm. Additionally, the pitch P1 and the depth D1 of the peaks 22 and valleys 24 can be varied along the length of the groove 14. The void volume of a groove 14 having the peaks 22 and valleys 24 is preferably at least 70% of the void volume of the groove 14 with no peaks 22 and valleys 24.

Figure 5:
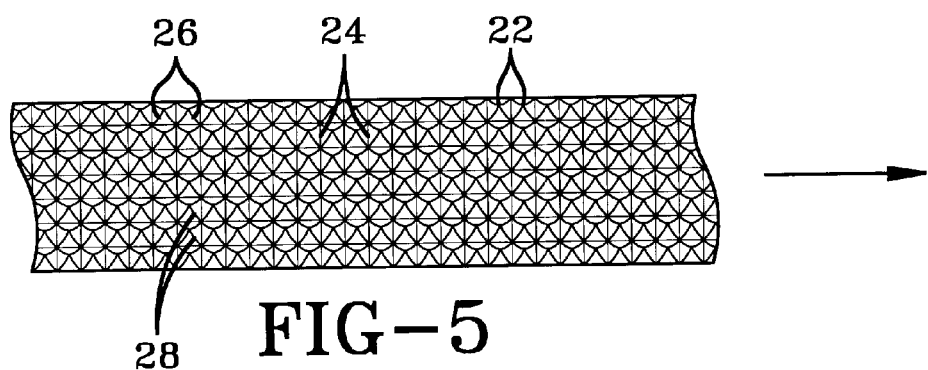
FIG. 5 is a view of a third embodiment of the groove surface undulations.
Figure 6:
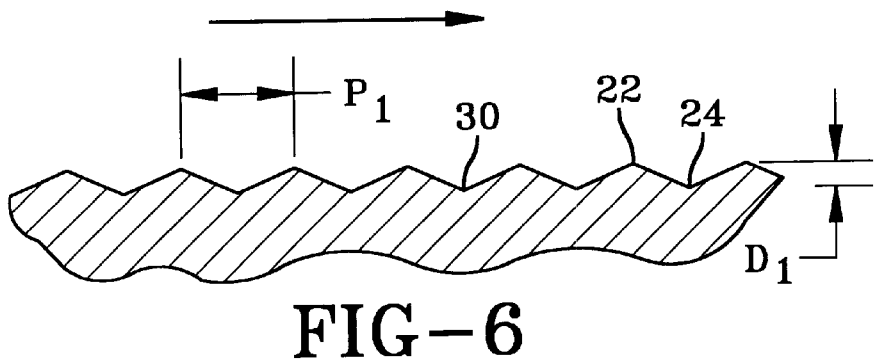
FIG. 6 is a view of a fourth embodiment of the groove surface undulations.

FIG. 5 is a view of an embodiment of the peaks 22 and valleys 24 where the depth D1 of each peak 22 varies as it extends across the respective surface. This varied depth D1 can be used to form a number of riblets 26. The riblets 26 may be separated by valleys 24 formed by V-shaped grooves 28 or smooth grooves. The peak 22 of each riblet 26 may come to a point or may be smooth. As with the previous peaks 22 and valleys 24, the pitch P1 and the depth D1 of the riblets 26 can be optimized for a particular Reynolds number. For best results the entire surface of the groove 14 should be covered with riblets 26, as illustrated. FIG. 6 shows a view of an embodiment of the peaks 22 and valleys 24 being separated by a series of V-shaped grooves 28 where the depth D1 of each peak 22 does not vary as it extends across a groove surface.

Figure 7:
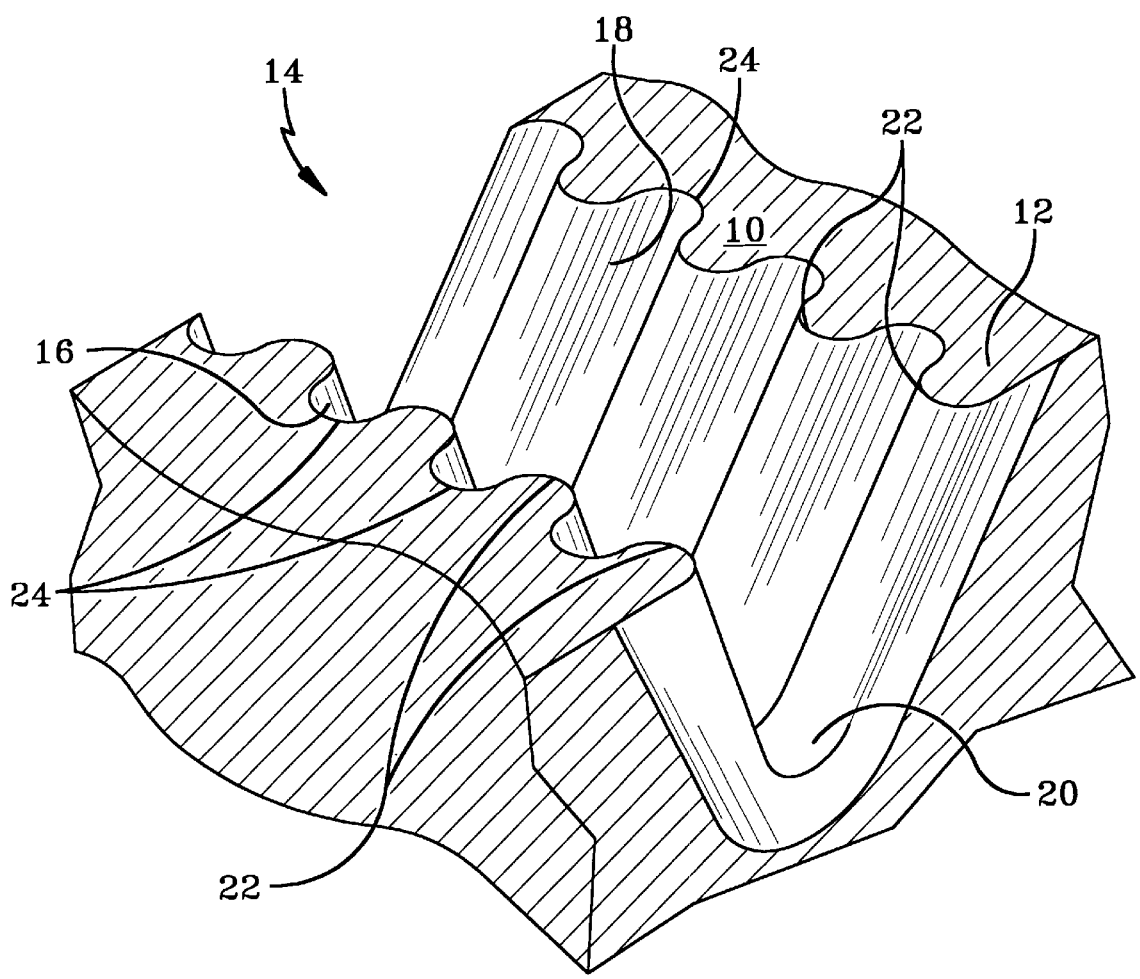
FIG. 7 is a view of a preferred embodiment of the groove surface undulations.

FIG. 7 is a view of a preferred embodiment of a groove 14 having peaks 22 and valleys 24. These surface peaks 22 and valleys 24 are sinusoidal waves. The peaks 22 and valleys 24 are present on two opposing surfaces and extend from the external surface 12 of the tread 10 adjacent a first side surface 16 to an external surface 12 of the tread 12 adjacent a second side surface 18. The groove 14 is shaped such that the surface peaks 22 and valleys 24 on the first side surface 16 are interconnected to those on the bottom 20 which are interconnected to those on the second side surface 18. Thus, the surface peaks 22 and valleys 24 on the first side surface 16 have the same wavelength as the surface peaks 22 and valleys 24 on the second side surface 18 and the bottom 20. The surface peaks 22 and valleys 24 of the first side surface 16 are 180 degrees out of phase from the surface peaks 22 and valleys 24 of the second side surface 18. In this preferred embodiment, the surface peaks 22 and valleys 24 are symmetrical such that the tire containing these surface peaks 22 and valleys 24 can be non-directional. The peaks 22 and valleys 24 that are not symmetrical, such as those depicted in FIG. 4, must be located on a directional tire to work at their optimal level.

The groove 14, in the preferred embodiment, has a depth defined by an average distance from the external surface 12 of the tread 10 to the bottom surface 20. A median plane bisects the channel formed by the respective surfaces of the groove 14. An imaginary line or arc is located on the median plane within the depth of the groove 14. If the groove 14 runs circumferentially, then the imaginary arc will follow the curvature of the tire. At least half of the valleys 24 of the respective surface containing the peaks 22 and valleys 24 following imaginary lines that are skewed with respect to the median plane line or arc by an angle in the range of from 45 degrees to 90 degrees. In the preferred embodiment, the valleys following imaginary lines that are skewed with respect to the median plane line or arc by an angle of 90 degrees. This angle measured by transposing each respective line or arc into the same plane and measuring the angle at the intersection of the respective lines.

Although only a few embodiments of peaks 22 and valleys 24 have been described in this application, additional configurations are contemplated by this invention. The peaks 22 and valleys 24 can be molded into the groove 14 of the tread 10 during manufacture of the tread 10 of the tire. A further possibility is to carve the peaks 22 and valleys 24 into the tread 10 of a finished tire.

The use of the peaks 22 and valleys 24 in the groove 14 of a tire tread 10 can have one of two purposes. First, the peaks 22 and valleys 24 can increase the amount of water ejected from the groove 14 at a particular velocity and, thus increase the wet traction of the tire. Second, the peaks 22 and valleys 24 can allow an equal amount of water ejection from a smaller groove, thus allowing the tire designers to increase the net to gross ratio of the tire, resulting in improved dry traction, while maintaining wet water traction at a particular velocity.

What is claimed is:

1. A tread for a pneumatic tire, an external surface of the tread having at least one groove for enclosing and channeling water during use of the tire on wet pavement, the groove having at least two surfaces defining a channel, the surfaces including two side surfaces, the respective side surfaces beginning at the external surface of the tread and extending radially inwardly toward an axis of rotation of the tire, the two side surfaces either intersecting with one another or with a bottom surface, the groove having a depth defined by an average distance from the external surface of the bead to the intersection of the two side surfaces or to the bottom surface, a median plane bisecting the channel formed by the respective surfaces of the groove, the groove having a width defined by twice an average distance from the median plane to a respective side surface, the tread being characterized by:

a series of peaks and valleys located on both side surfaces of the groove, an imaginary line or arc bisecting the channel formed by the respective surfaces of the groove, extending along the length of the channel, and being located on the median plane within the depth of the groove, at least half of the valleys following imaginary lines that are skewed with respect to the median plane line or arc by an angle or angles in the range of from 45 degrees to 90 degrees, each peak having a maximum depth of 15% of the groove width and a minimum depth of at least 5% of the groove width, the depth being defined as the average distance from the peak to the valley, the series of peaks and valleys having a pitch between respective peaks of less than 40 % of the groove width, when water flows through the groove, the series of peaks and valleys disrupt eddies or vortices along the side surfaces of the groove decreasing skin friction drag, each valley extending continuously from one side surface of the groove to the other side surface of the groove.

2. A tire tread as in claim 1, the tread being further characterized by: a pitch between respective peaks varying along a length of the groove.

3. A tire tread as in claim 1, the tread being further characterized by: the series of peaks and valleys being on both side surfaces, the peaks and valleys of the two side surfaces having identical wavelengths and the peaks and valleys on a first surface being 180 degrees out of phase from the peaks and valleys of a second surface.

4. A tire tread as in claim 1, the tread being further characterized by: the depth (D1) of each peak varying as it extends radilly inwardly across a respective surface.

5. The tire tread as in claim 4 wherein the peaks and valleys are symmetrically located along the length of the groove.

6. The tire tread as in claim 1 wherein the peaks and valleys form a sinusoidal wave along the length of both sides of the groove.

7. The tire tread as in claim 1 wherein the peaks and valleys form a sawtooth configuration along the length of both sides of the groove.

* * * * *